(12) United States Patent
de Montmorillon et al.

(10) Patent No.: US 6,396,987 B1
(45) Date of Patent: May 28, 2002

(54) LINE FIBER FOR WDM OPTICAL FIBER TRANSMISSION SYSTEMS

(75) Inventors: Louis-Anne de Montmorillon, Paris; Pascale Nouchi, Maisons Laffitte; Jean-Claude Rousseau, Chatou; Raphaelle Sauvageon, Thones; Jean-François Chariot, Marly le Roi; Alain Bertaina, Villebon sur Yvette, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/372,085

(22) Filed: Aug. 11, 1999

(30) Foreign Application Priority Data

Feb. 18, 1999 (FR) .............................. 99 02028

(51) Int. Cl.$^7$ ................................. G02B 6/02
(52) U.S. Cl. ...................... 385/123; 385/124; 385/126; 385/127
(58) Field of Search ................................. 385/123, 124, 385/126, 127

(56) References Cited

U.S. PATENT DOCUMENTS

| | | | | | |
|---|---|---|---|---|---|
| 5,581,647 | A | * | 12/1996 | Onishi et al. | ............... 385/123 |
| 5,613,027 | A | * | 3/1997 | Bhagavatula | ............... 385/123 |
| 5,822,488 | A | * | 10/1998 | Terasawa et al. | ........... 385/127 |
| 5,835,655 | A | * | 11/1998 | Liu et al. | .................... 385/124 |
| 5,878,182 | A | * | 3/1999 | Peckham | .................... 385/123 |
| 6,031,956 | A | * | 2/2000 | Li et al. | .................... 385/124 |

* cited by examiner

*Primary Examiner*—Rodney Bovernick
*Assistant Examiner*—Sung Pak
(74) *Attorney, Agent, or Firm*—Sughrue Mion, PLLC (57) ABSTRACT

The invention provides a monomode optical fiber having, at a wavelength of 1550 nm: an effective section area greater than or equal to 60 $\mu m^2$; chromatic dispersion close to 8 ps/(nm.km); a chromatic dispersion slope of absolute value less than 0.07 ps/(nm$^2$.km). In the range of wavelengths used in a WDM transmission system, typically 1530 nm to 1620 nm, the fiber has chromatic dispersions greater than 7 ps/(nm.km), thereby making it possible to limit non-linear effects. The invention also provides a WDM optical fiber transmission system using such a fiber as a line fiber. The small slope of its chromatic dispersion is an advantage in such a system.

13 Claims, 8 Drawing Sheets

LINE FIBER FOR WDM OPTICAL FIBER TRANSMISSION SYSTEMS

The present invention relates to the field of transmission by optical fiber, and more particularly to the field of transmission by wavelength division multiplexing (WDM) using a dispersion-shifted line fiber.

BACKGROUND OF THE INVENTION

For optical fibers, the index profile is generally described as a function of the appearance of a graph showing refractive index as a function of fiber radius. Conventionally, distance r from the center of the fiber is plotted along the abscissa, and the difference between the refractive index and the refractive index of the cladding of the fiber is plotted up the ordinate. Index profiles are thus said to be "stepped", "trapezoid", or "triangular" for graphs that are respectively stepped, trapezoid, or triangular in shape. These curves are generally representative of the theoretical or ideal profile of the fiber, since constraints associated with manufacturing the fiber can lead to a profile that is significantly different.

In new very high data rate transmission networks that are wavelength division multiplexed, it is advantageous to generate chromatic dispersion, in particular for channel rates that are greater than or equal to 10 Gbit/s. The objective is to obtain accumulated chromatic compensation that is substantially zero over the link for all wavelength values in the multiplex, so as to limit the extent to which pulses are broadened. An accumulated value of a few hundreds of ps/nm in the dispersion is acceptable. It is also advantageous to avoid chromatic dispersion zeros in the vicinity of the wavelengths used in the system because non-linear effects are greater at such zeros. Finally, it is also advantageous to limit the chromatic dispersion slope over the range of the multiplex so as to avoid or at least limit distortion between the channels of the multiplex.

Dispersion-shifted fibers (DSF) have appeared on the market. These fibers are such that chromatic dispersion is substantially zero at the transmission wavelengths at which they are used, which wavelengths are generally not equal to the wavelength of 1.3 $\mu$m at which the dispersion of silica is substantially zero. In other words the non-zero chromatic dispersion of silica is compensated by increasing the refractive index difference $\Delta n$ between the core of the fiber and its cladding, whence the term "shifted". This difference in index makes it possible to shift the wavelength at which chromatic dispersion is zero; it is obtained by introducing dopants into the preform during manufacture thereof, for example by means of a modified chemical vapor deposition (MCVD) process of the kind that is known per se, and which is not described in greater detail below.

The term "non-zero dispersion-shifted fibers" (NZ-DSF) is used to designate dispersion-shifted fibers having non-zero chromatic dispersion at the wavelengths at which they are used. For WDM optical fiber transmission systems, proposals have been made to use NZ-DSFs as line fibers, and to compensate chromatic dispersion by using sections of dispersion-compensating fiber (DCF). An example of such a transmission system is described in M. Nishimura et al., Dispersion-compensating fibers and their applications, OFC'96 Technical Digest ThA.

That solution suffers from the drawback of allowing only small power margins to be used, thereby making it difficult to operate the transmission system under realistic conditions, in particular for WDM transmission systems having a large number of channels.

Proposals have also been made to use DCF to correct the chromatic dispersion induced by a step index line fiber also known as a single-mode fiber or SMF. Such use of a dispersion-compensating fiber is mentioned in L. Grüner-Nielsen et al., Large-volume manufacturing of dispersion-compensating fibers, OFC'98 Technical Digest TuD5. A drawback of that of fiber is its high cost.

The Applicant sells one such step index monomode fiber under the reference ASMF 200. It has a chromatic dispersion canceling wavelength lying in the range 1300 nm to 1320 nm, and it also has chromatic dispersion that is not greater than 3.5 ps/(nm.km) in the range 1285 nm-1330 nm, and not greater than 17 ps/(nm.km) at 1550 nm. At 1550 nm the chromatic dispersion slope is about 0.056 ps/(nm$^2$.km). That fiber is of the kind mentioned as a line fiber in the above-mentioned article by L. Grüner-Nielsen et al.

Compared with NZ-DSF systems having compensation using DCF, an SMF and DCF configuration has the advantage of very little penalty at high optical power, in other words it withstands non-linear effects better, and in particular it withstands four-wave mixing better. This ensures that transmission systems work properly not only under laboratory conditions, but also in the field. Nevertheless, that configuration suffers from the drawback of cost that is nearly double.

A new problem also arises for such an SMF/DCF configuration with transmission at very high data rates, typically with transmission at N×40 Gbit/s or more, insofar as the size of the amplification-and-compensation segments does not make it possible to compensate effectively the distortion applied within each segment by dispersion and by non-linearity.

OBJECTS AND SUMMARY OF THE INVENTION

The invention proposes a solution to this new problem. More generally, the invention provides a solution to the problem of increasing channel data rate in WDM transmission systems; the solution of the invention makes it possible to retain a power margin that is compatible with operating conditions in the field. The invention also makes it possible to keep down the cost of the system.

More precisely, the invention provides a monomode optical fiber that presents, at a wavelength of 1550 nm:

an effective section area greater than or equal to 60 $\mu$m$^2$;

chromatic dispersion lying in the range 6 ps/(nm.km) to 10 ps/(nm.km), and chromatic dispersion having a slope of absolute value less than 0.07 ps/(nm$^2$.km).

Advantageously, the fiber has chromatic dispersion at 1550 nm in the range 7 ps/(nm.km) to 9 ps/(nm.km).

Preferably, the fiber presents chromatic dispersion greater than or equal to 7 ps/(nm.km) in the range 1530 nm to 1620 nm.

In an embodiment, the fiber has a chromatic dispersion slope at 1550 nm less than 0.05 ps/(nm$^2$.km).

Advantageously, the fiber has an effective section area greater than or equal to 90 $\mu$m$^2$.

Preferably, the fiber has a mode radius at 1550 nm greater than 4 $\mu$m.

In another embodiment, the fiber has attenuation at 1550 nm less than or equal to 0.23 dB/km.

Preferably, the fiber has polarization mode dispersion less than or equal to 0.08 ps.km$^{-0.5}$.

In an embodiment, the fiber has an index profile in the shape of a trapezoid with a ring.

In another embodiment, the fiber has an index profile that is coaxial with a ring.

In yet another embodiment, the fiber has a coaxial index profile with a buried outer portion.

The invention also provides a WDM optical fiber transmission system having such a fiber as its line fiber.

In an embodiment, the transmission system further comprises dispersion compensation fiber.

BRIEF DESCRIPTION OF THE DRAWINGS

Other characteristics and advantages of the invention will appear on reading the following description of embodiments of the invention, given by way of example and with reference to the accompanying drawings, in which.

MORE DETAILED DESCRIPTION

The invention proposes using a monomode fiber as the line fiber in a WDM transmission system, which fiber has chromatic dispersion that is smaller than that of presently-existing step-index fiber, but otherwise conserves characteristics that are analogous.

The invention thus makes it possible to conserve the technical advantages provided by using the known step-index fiber, and in particular the reduction in non-linear effects, because of:

the large value of its effective section area, typically greater than 70 $\mu m^2$ or 80 $\mu m^2$ for conventional fiber; and the large value of its chromatic dispersion, typically greater than 15 ps/(nm.km) for conventional fiber.

The decrease in chromatic dispersion of the invention makes it possible to decrease the quantity of DCF required for compensating chromatic dispersion. This reduces the cost of the transmission system.

Because the value of the chromatic dispersion of the fiber of the invention remains close to 8 ps/(nm.km) at 1550 nm, non-linear effects nevertheless remain limited. In the range of wavelengths in the multiplex, 1530 nm to 1620 nm, chromatic dispersion remains greater than 7 ps/(nm.km). The invention makes it possible to provide WDM systems with a data rate per channel that is greater than or equal to 40 Gbit/s.

For a bit error rate of $10^{-10}$, the fiber of the invention makes it possible to achieve a penalty of less than 2.5 dB compared with ideal transmission on the most heavily penalized of the 32 channels in a WDM transmission system. By way of comparison, for the same transmission system, the penalty for a prior art line fiber is about 4 dB.

The preferred characteristics of the fiber of the invention are thus as follows:

effective section area greater than or equal to 60 $\mu m^2$, and preferably greater than 90 $\mu m^2$;

chromatic dispersion at 1550 nm lying in the range 6 ps/(nm.km) to 10 ps/(nm.km), and preferably in the range 7 ps/(nm.km) to 9 ps/(nm.km);

chromatic dispersion greater than or equal to 7 ps/(nm.km) in the range 1530 nm to 1620 nm;

chromatic dispersion slope at 1550 nm having an absolute value of less than 0.07 ps/(nm$^2$.km), and preferably less than 0.05 ps/(nm$^2$.km);

W02 mode radius at 1550 nm greater than 4 $\mu m$;

attenuation at 1550 nm less than or equal to 0.023 dB/km; and polarization mode dispersion less than or equal to 0.08 ps.km$^{-0.5}$.

Examples of fiber profiles enabling such values to be achieved are given in the description below relating to the figures.

Figure 1:
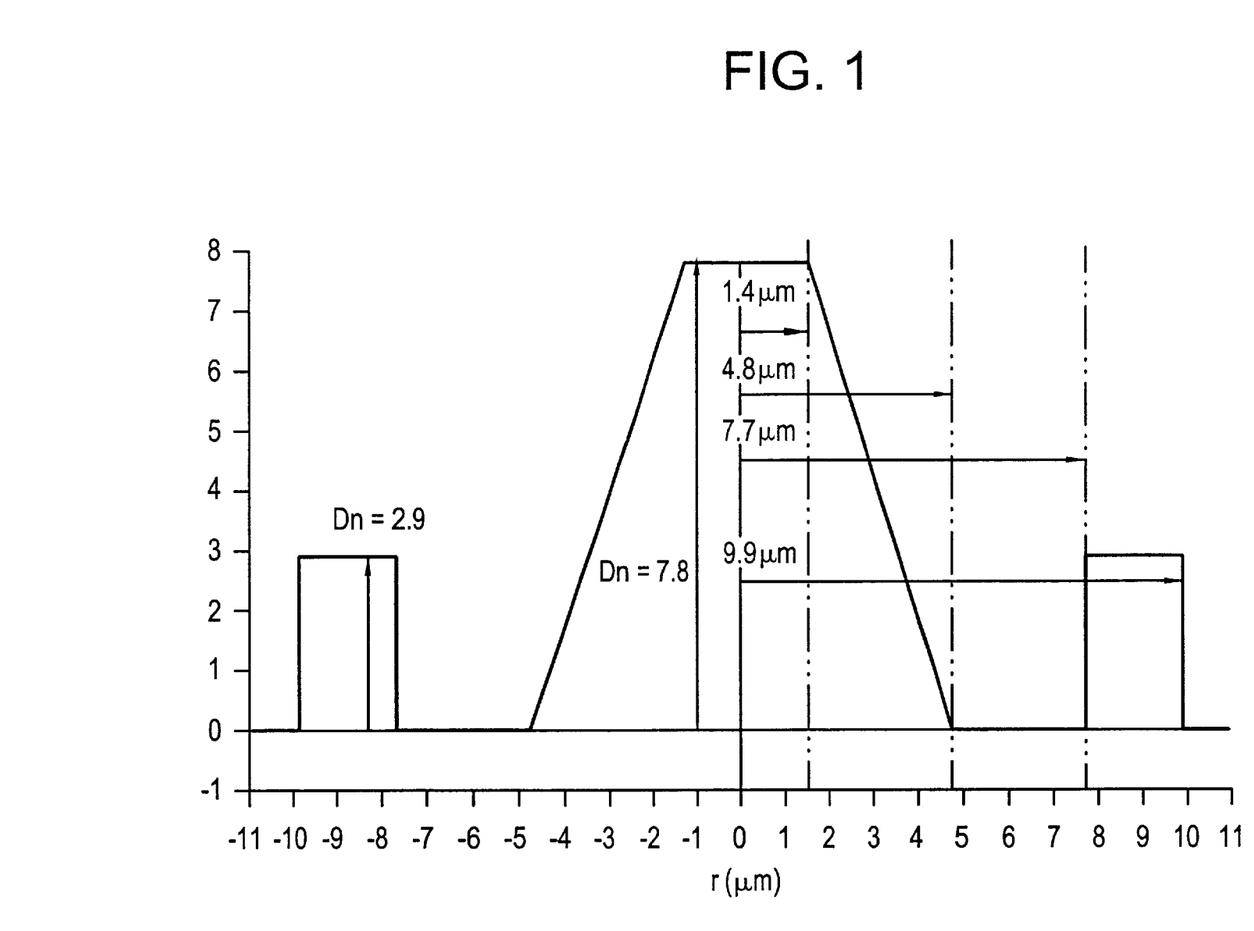
FIG. 1 is a diagram of the index profile of a fiber constituting a first embodiment of the invention.

FIG. 1 is a diagram of the index profile of a fiber constituting a first embodiment of the invention; in this embodiment, the index profile is a trapezoid type index profile with a ring, and it presents, starting from the center of the fiber:

a central portion having a refractive index greater than that of the cladding; and a first annular portion in which the index decreases in substantially linear manner;

the fiber as a whole constituting a fiber having a so-called "trapezoid" profile.

Around this first annular portion, the fiber has a portion of substantially constant index, followed by a second annular portion of index greater than that of the cladding, forming a ring about the trapezoid profile.

The values for the indices and the radii in the embodiment of FIG. 1 are as follows. The central portion has a radius $r_1$ of 1.4 $\mu m$ and its index differs from the index of the cladding by $\Delta n_1$ equal to $7.8 \times 10^{-3}$.

The index decreases in substantially linear manner to go from the value $\Delta n_1$ to a zero value between radius $r_1$ and radius $r_2 = 4.8$ $\mu m$.

The portion of substantially constant index extends from radius $r_2$ to radius $r_3 = 7.7$ $\mu m$, and its index is equal to the index of the cladding.

The second annular portion extends from radius $r_3$ to radius $r_4 = 9.9$ $\mu m$, over a thickness of 2.2 $\mu m$. The difference $\Delta n_4$ between its index and the index of the cladding is $2.9 \times 10^{-3}$.

These values make it possible to obtain a fiber having the following characteristics:

a theoretical cutoff wavelength $\lambda_{cth}$: 1770 nm;

a chromatic dispersion canceling wavelength $\lambda_0$: 1430 nm;

chromatic dispersion slope at 1550 nm: 0.062 ps/(nm$^2$.km);

chromatic dispersion at 1550 nm: 8 ps/(nm.km);

W02 mode radius at 1550 nm: 4.7 $\mu m$;

effective section area at 1550 nm: 65 $\mu m^2$;

attenuation due to bending: $1.4 \times 10^{-4}$ dB; and sensitivity to microbending at 1550 nm: 0.62.

Attenuation due to bending is the attenuation caused by winding 100 turns of fiber about a radius of 30 mm, as measured at 1550 nm. Sensitivity to microbending is measured as a relative value compared with the above-mentioned ASMF 200 fiber, by any conventional method.

The theoretical cutoff wavelength $\lambda$cth is generally more than two to four hundreds of nanometers greater than the wavelength actually measured on the cable. As a result, the cutoff wavelength on a cable using the fiber of FIG. 1 is less than 1500 nm, so the fiber is effectively a monomode fiber within the wavelength range of the multiplex.

The reference values for the radii and the indices given with reference to FIG. 1 can be varied, with the fiber retaining its properties. The tolerance ranges around the reference values given above are given below.

Figure 2:
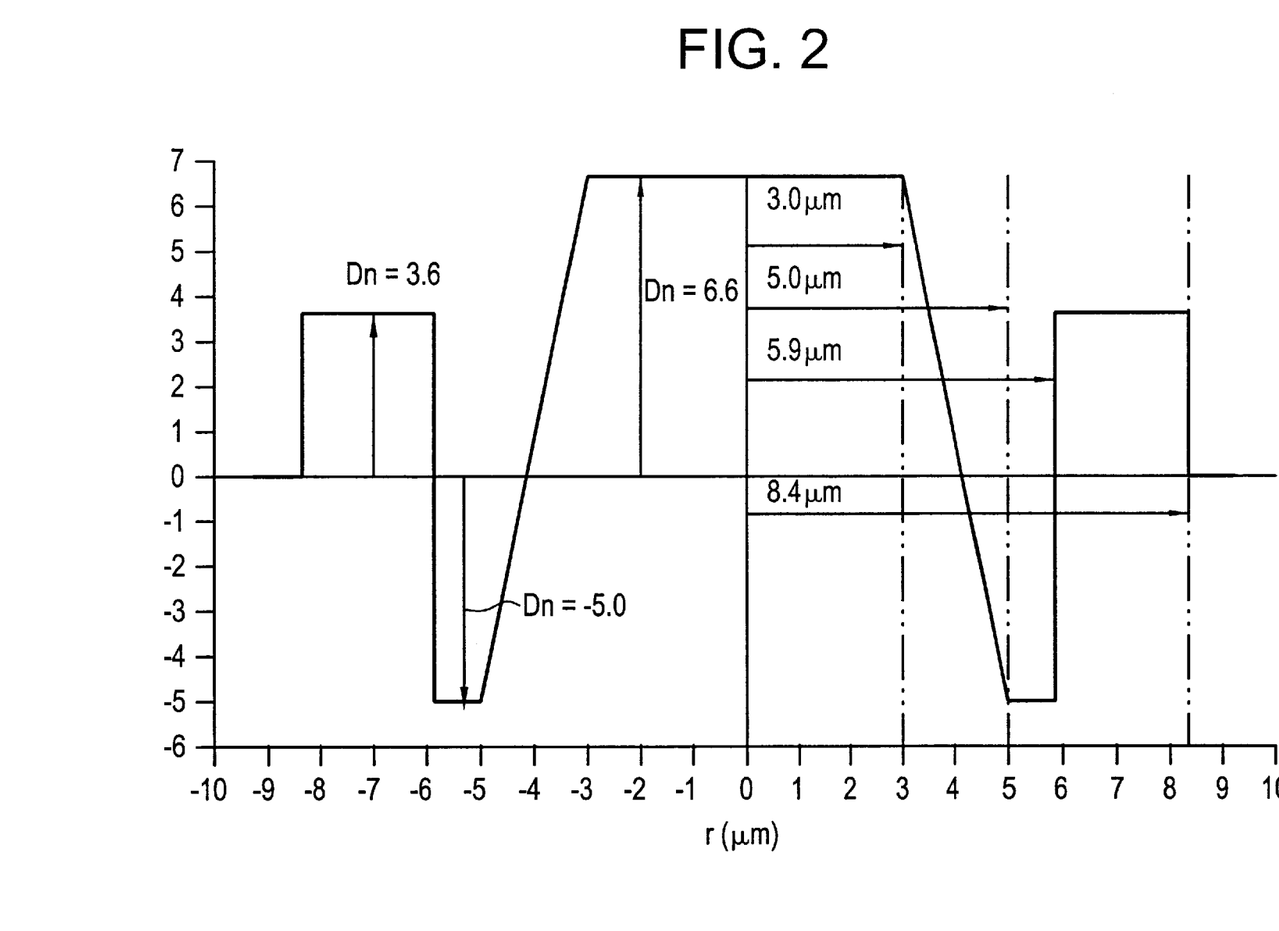
FIG. 2 is a diagram of the index profile of a fiber constituting a second embodiment of the invention.

FIG. 2 is a diagram of the index profile of a fiber constituting a second embodiment of the invention. In this embodiment, the index profile is a trapezoid type index profile having buried cladding with a ring. In other words, compared with the profile of FIG. 1, the substantially constant index portion surrounding the trapezoid has an index smaller than the index of the fiber cladding. The profile of FIG. 2 is described using the same notation as used for FIG. 1 concerning radii and indices.

The geometrical characteristics of the profile of FIG. 2 are as follows:

$r_1 = 3.0\ \mu m$ $r_2 = 5.0\ \mu m$ $r_3 = 5.9\ \mu m$ $r_4 = 8.4\ \mu m$ $\Delta n_1 = 6.6$ $\Delta n_3 = -5.0$ $\Delta n_4 = 3.6$ These values make it possible to obtain a fiber having the following characteristics:

a theoretical cutoff wavelength $\lambda_{cth}$: 1620 nm;

a chromatic dispersion canceling wavelength $\lambda_0$: 1410 nm;

chromatic dispersion slope at 1550 nm: 0.055 ps/(nm$^2$.km);

chromatic dispersion at 1550 nm: 8 ps/(nm.km);

W02 mode radius at 1550 nm: 4.6 $\mu m$;

effective section area at 1550 nm: 65 $\mu m^2$;

attenuation due to bending: $3 \times 10^{-4}$ dB; and sensitivity to microbending at 1550 nm: 0.69.

Figure 3:
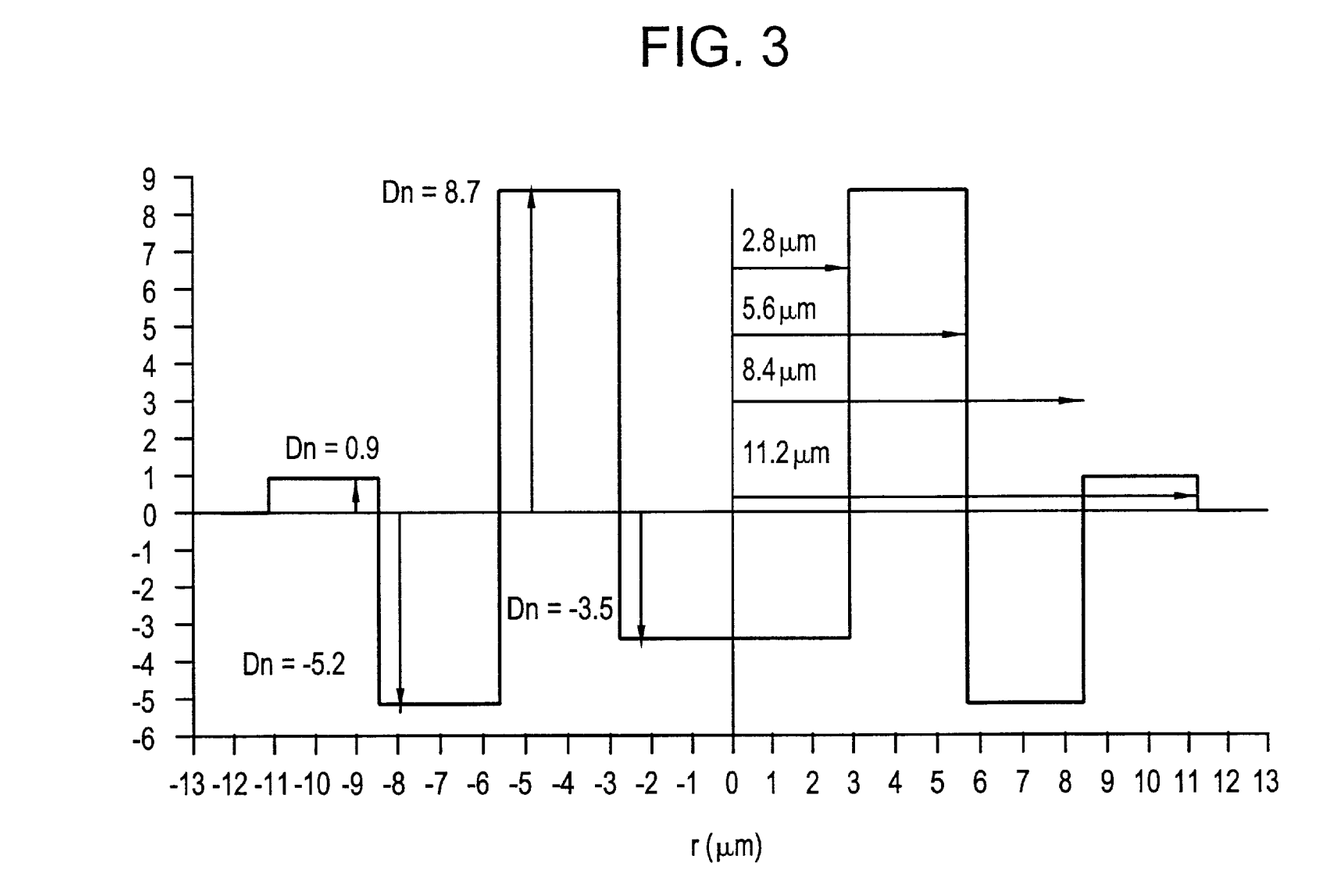
FIG. 3 is a diagram of the index profile of a fiber constituting a third embodiment of the invention.
Figure 4:
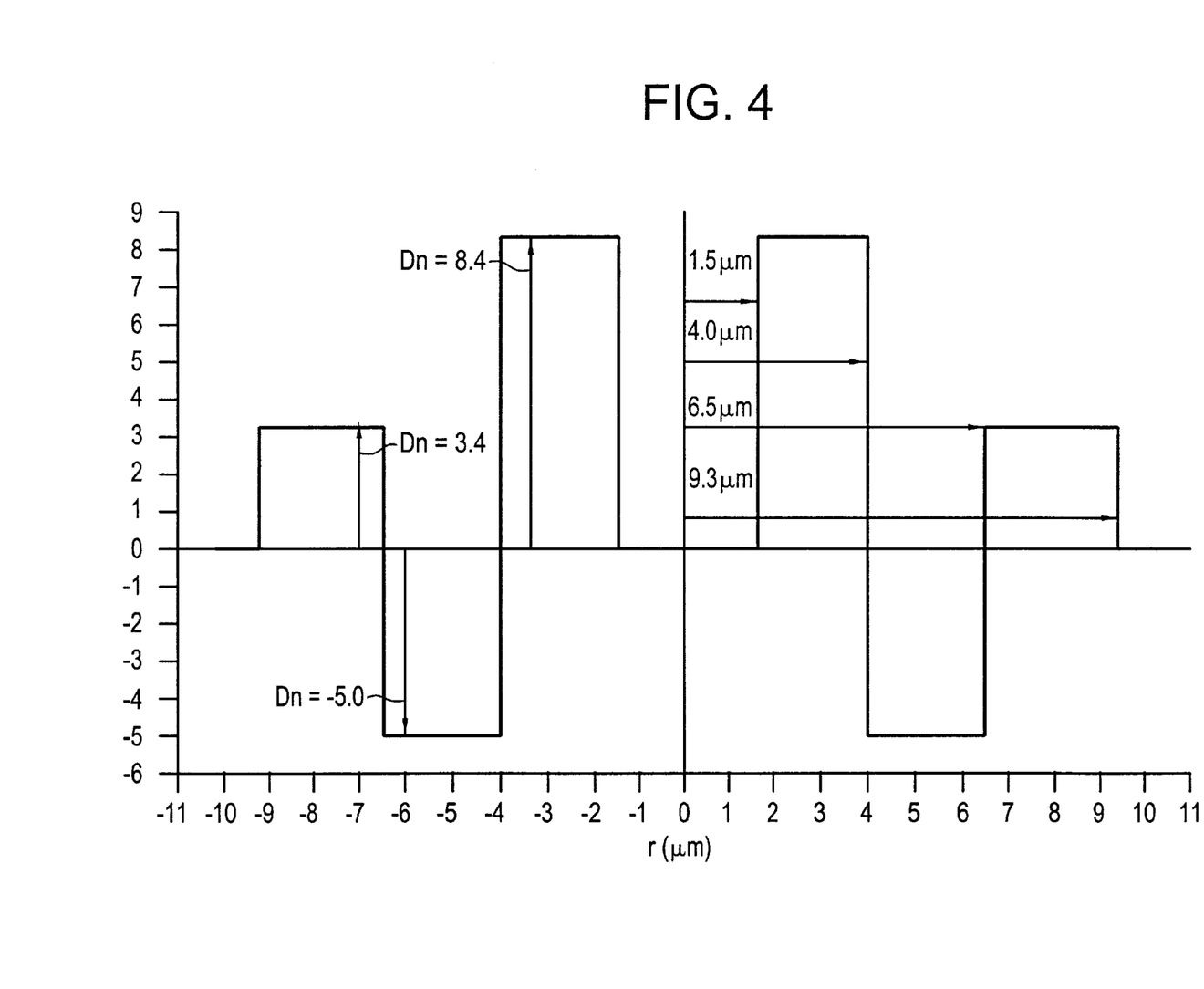
FIG. 4 is a diagram of the index profile of a fiber constituting a fourth embodiment of the invention.
Figure 5:
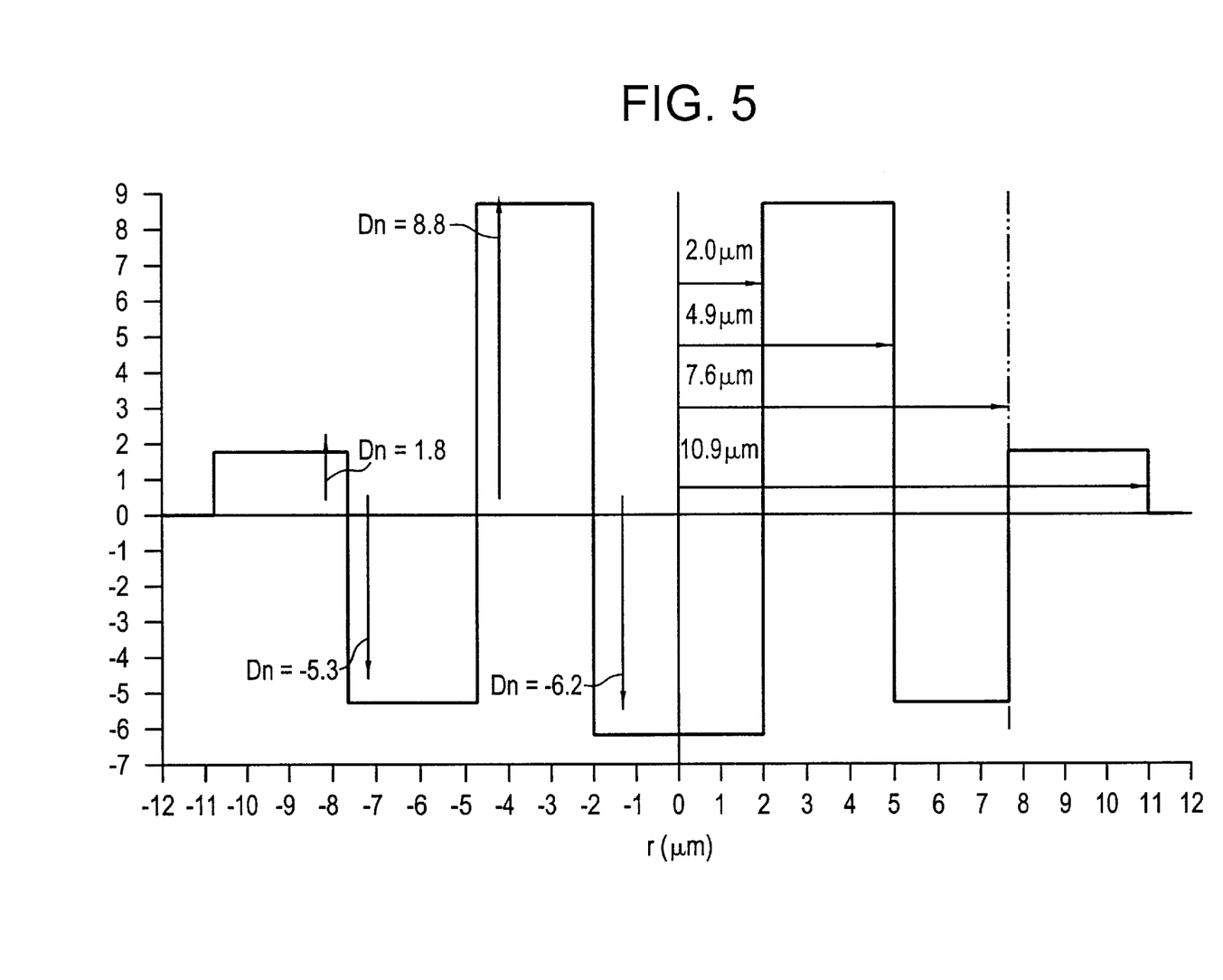
FIG. 5 is a diagram of the index profile of a fiber constituting a fifth embodiment of the invention.

As in FIG. 1, variations in the indices and in the radii compared with the reference values given with reference to FIG. 2 can still allow a fiber of the invention to be obtained. The table below gives tolerances around the reference values, where the first row relates to the embodiment of FIG. 1 and the second row relates to the embodiment of FIG. 2. Radii are in micrometers and index values are to be multiplied by $10^{-3}$.

a central portion of substantially constant index; and a first annular portion of index greater than that of the cladding, and also greater than that of the central portion;

the assembly constituting a fiber whose profile is said to be "coaxial".

Around the first annular portion, the fiber has a buried portion of index that is less than or substantially equal to that of the cladding, followed by a second annular portion of index greater than that of the cladding, forming a ring around the coaxial profile.

The index and radius values in the third, fourth, and fifth embodiments are given in the following table, it being understood that the fibers in these embodiments have the profiles of FIGS. 3, 4, and 5, respectively. Radii are given in micrometers, and indices are to be multiplied by $10^{-3}$.

| $r_1$ | $r_2$ | $r_3$ | $r_4$ | $\Delta n_1$ | $\Delta n_2$ | $\Delta n_3$ | $\Delta n_4$ |
|---|---|---|---|---|---|---|---|
| 2.8 | 5.6 | 8.4 | 11.2 | −3.5 | 8.7 | −5.2 | 0.9 |
| 1.5 | 4.0 | 6.5 | 9.3 | 0 | 8.4 | −5.0 | 3.4 |
| 2.0 | 4.9 | 7.6 | 10.9 | −6.2 | 8.8 | −5.3 | 1.8 |

These various embodiments having a coaxial-plus-ring profile enable fibers of the invention to be obtained having characteristics given in the corresponding rows in the table below:

| $\lambda_{cth}$ (nm) | $\lambda_0$ (nm) | dC/dλ ps/(nm$^2$.km) | C ps/(nm.km) | W02 ($\mu m$) | $S_{eff}$ ($\mu m^2$) | PC (dB) | $S_{\mu c}$ |
|---|---|---|---|---|---|---|---|
| 1700 | 1440 | 0.066 | 8 | 4.2 | 118 | $2.8 \times 10^{-4}$ | 1.04 |
| 1710 | 1400 | 0.045 | 8 | 4.3 | 71 | $5.9 \times 10^{-4}$ | 0.74 |
| 1630 | 1430 | 0.058 | 8 | 4.1 | 93 | $2.4 \times 10^{-5}$ | 0.6 |

| $r_1$ | $r_2$ | $r_3$ | $r_4$ | $\Delta n_1$ | $\Delta n_3$ | $\Delta n_4$ |
|---|---|---|---|---|---|---|
| 1.4 ± 0.1 | 4.8 ± 0.5 | 7.7 ± 0.8 | 9.9 ± 1.0 | 7.8 ± 0.5 | 0 ± 0.5 | 2.9 ± 0.5 |
| 3.0 ± 0.3 | 5.0 ± 0.5 | 5.9 ± 0.6 | 8.4 ± 0.8 | 6.6 ± 0.5 | −5.0 ± 0.5 | 3.6 ± 0.5 |

FIGS. 3, 4, and 5 are diagrams for the index profile of fibers constituting third, fourth, and fifth embodiments of the invention. In each of these embodiments, the index profile is of the coaxial type having a ring, and presenting, going from the center of the fiber:

As with the preceding figures, the values for the radii and the indices can vary about the reference values given. The table below gives the tolerances about those reference values, using the same units.

| $r_1$ | $r_2$ | $r_3$ | $r_4$ | $\Delta n_1$ | $\Delta n_2$ | $\Delta n_3$ | $\Delta n_4$ |
|---|---|---|---|---|---|---|---|
| 2.8 ± 0.3 | 5.6 ± 0.6 | 8.4 ± 0.8 | 11.2 ± 1.1 | −3.5 ± 0.5 | 8.7 ± 0.5 | −5.2 ± 0.5 | 0.9 ± 0.5 |
| 1.5 ± 0.2 | 4.0 ± 0.4 | 6.5 ± 0.6 | 9.3 ± 0.39 | 0 ± 0.5 | 8.4 ± 0.5 | −5.0 ± 0.5 | 3.4 ± 0.5 |
| 2.0 ± 0.2 | 4.9 ± 0.5 | 7.6 ± 0.8 | 10.9 ± 1.1 | −6.2 ± 0.5 | 8.8 ± 0.5 | −5.3 ± 0.5 | 1.8 ± 0.5 |

Figure 6:
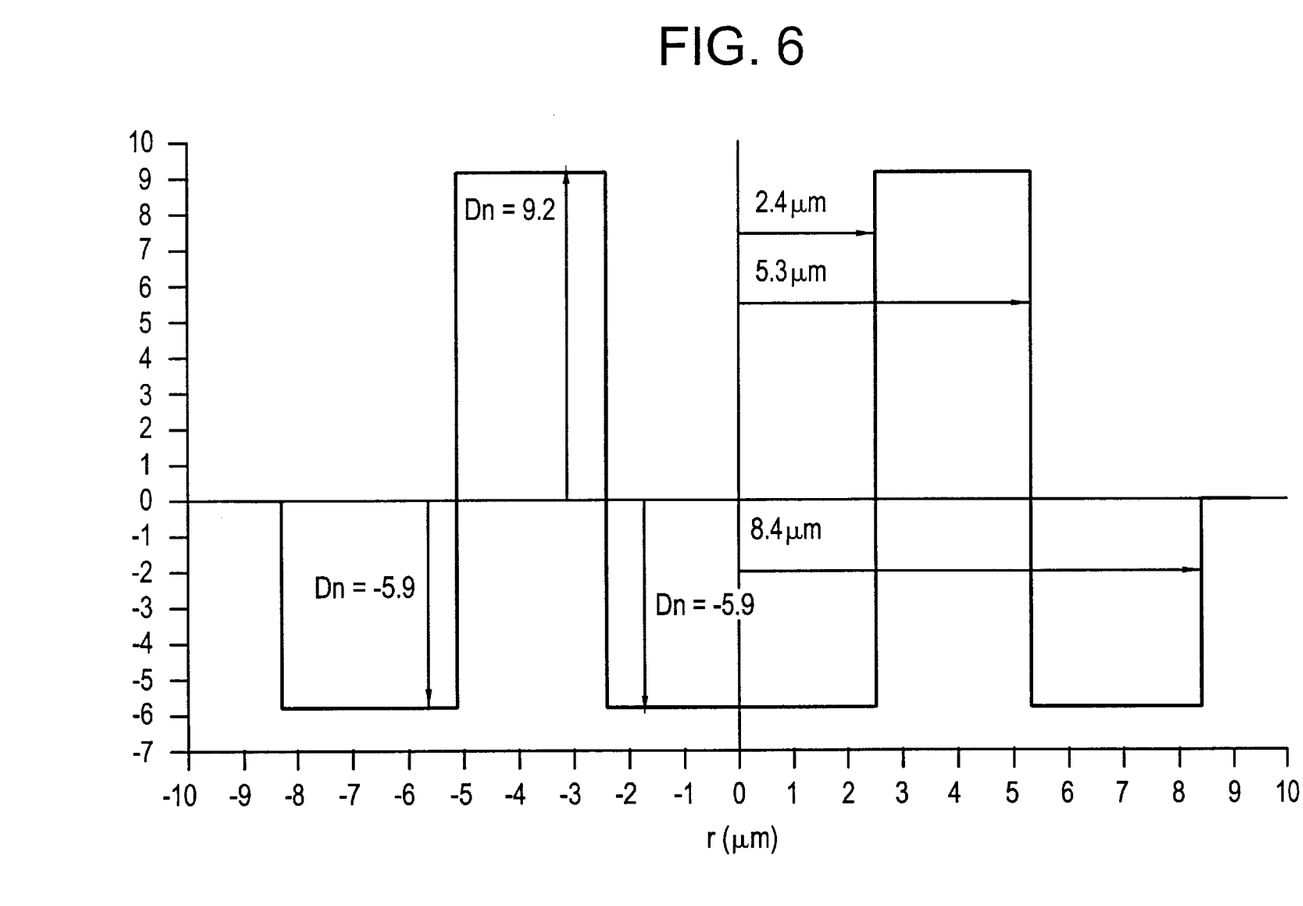
FIG. 6 is a diagram of the index profile of a fiber constituting a sixth embodiment of the invention.

FIG. 6 is a diagram showing the index profile of a fiber constituting a sixth embodiment of the invention. The profile of FIG. 6 is a coaxial profile, surrounded by a buried portion. Starting from the center, the fiber has:

a central portion of substantially constant index;

an annular portion of index greater than the index of the cladding, and also greater than the index of the central portion; and a buried portion of index smaller than the index of the cladding.

The index and radius values given in the embodiment of FIG. 6 are as follows. The central portion has a radius $r_1$ of 2.4 μm and its index differs from the index of the cladding by $\Delta n_1 = -5.9 \times 10^{-3}$.

The annular portion extends between the radius $r_1$ and the radius $r_2 = 5.3$ μm, and its index differs from that of the cladding by $\Delta n_2 = 9.2 \times 10^{-3}$.

The buried portion extends from radius $r_2$ to radius $r_3 = 8.4$ μm. Compared with the index of the cladding, its index differs by $\Delta n_3 = -5.9 \times 10^{-3}$.

A fiber having the index profile of FIG. 6 has the following characteristics:

a theoretical cutoff wavelength $\lambda_{cth}$: 1630 nm;

a chromatic dispersion canceling wavelength $\lambda_0$: 1430 nm;

chromatic dispersion slope at 1550 nm: 0.063 ps/(nm$^2$.km);

chromatic dispersion at 1550 nm: 8 ps/(nm.km);

W02 mode radius at 1550 nm: 3.9 μm;

effective section area at 1550 nm: 102 μm$^2$;

attenuation due to bending: $3 \times 10^{-5}$ dB; and sensitivity to microbending at 1550 nm: 0.75.

Again, it is possible to vary the radii and the indices about the reference values given in the figure while still obtaining a fiber of the invention. The following table gives the ranges of possible variation around the reference values, using the same units.

| $r_1$ | $r_2$ | $r_3$ | $r_4$ | $\Delta n_1$ | $\Delta n_3$ |
|---|---|---|---|---|---|
| 2.4 ± 0.2 | 5.3 ± 0.5 | 8.4 ± 0.8 | −5.9 ± 0.5 | 9.2 ± 0.5 | 5.9 ± 0.5 |

Figure 7:
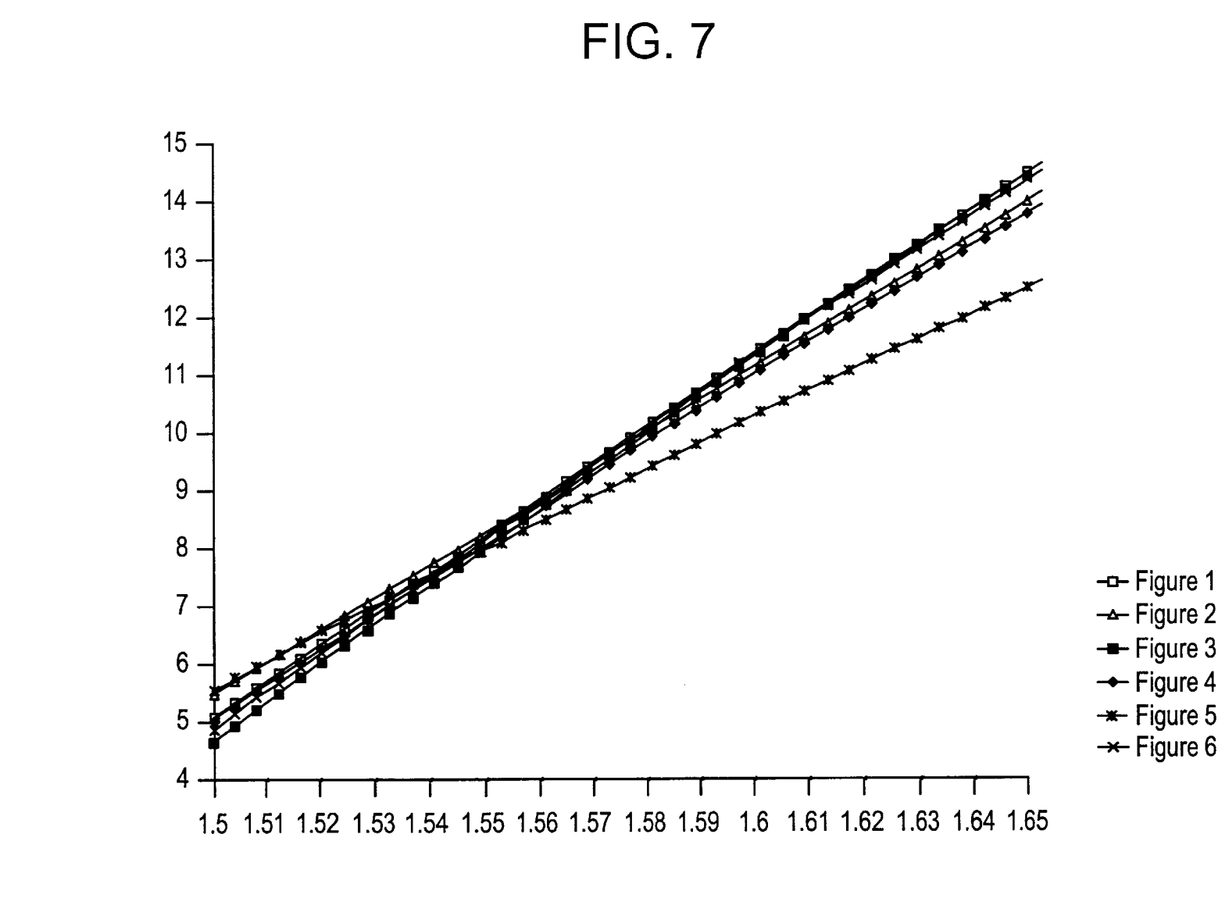
FIG. 7 is a graph showing dispersion as a function of wavelength for various fibers of the invention.

FIG. 7 is a graph plotting dispersion as a function of wavelength for the various fibers of the invention. Wavelength in μm is plotted along the abscissa over the range 1.5 μm to 1.64 μm. Chromatic dispersion at 1550 nm is plotted up the ordinate in ps/(nm.km). The figure shows how dispersion varies as a function of wavelength for fibers of the first to sixth embodiments described above. It can be seen in the figure that chromatic dispersion is 8 ps/(nm.km) at 1550 nm for all of the fibers, and lies within the range 7 ps/(nm.km) to 14 ps/(nm.km) for all wavelengths lying in the range 1530 nm to 1620 nm, in all of the fibers given by way of example.

Figure 8:
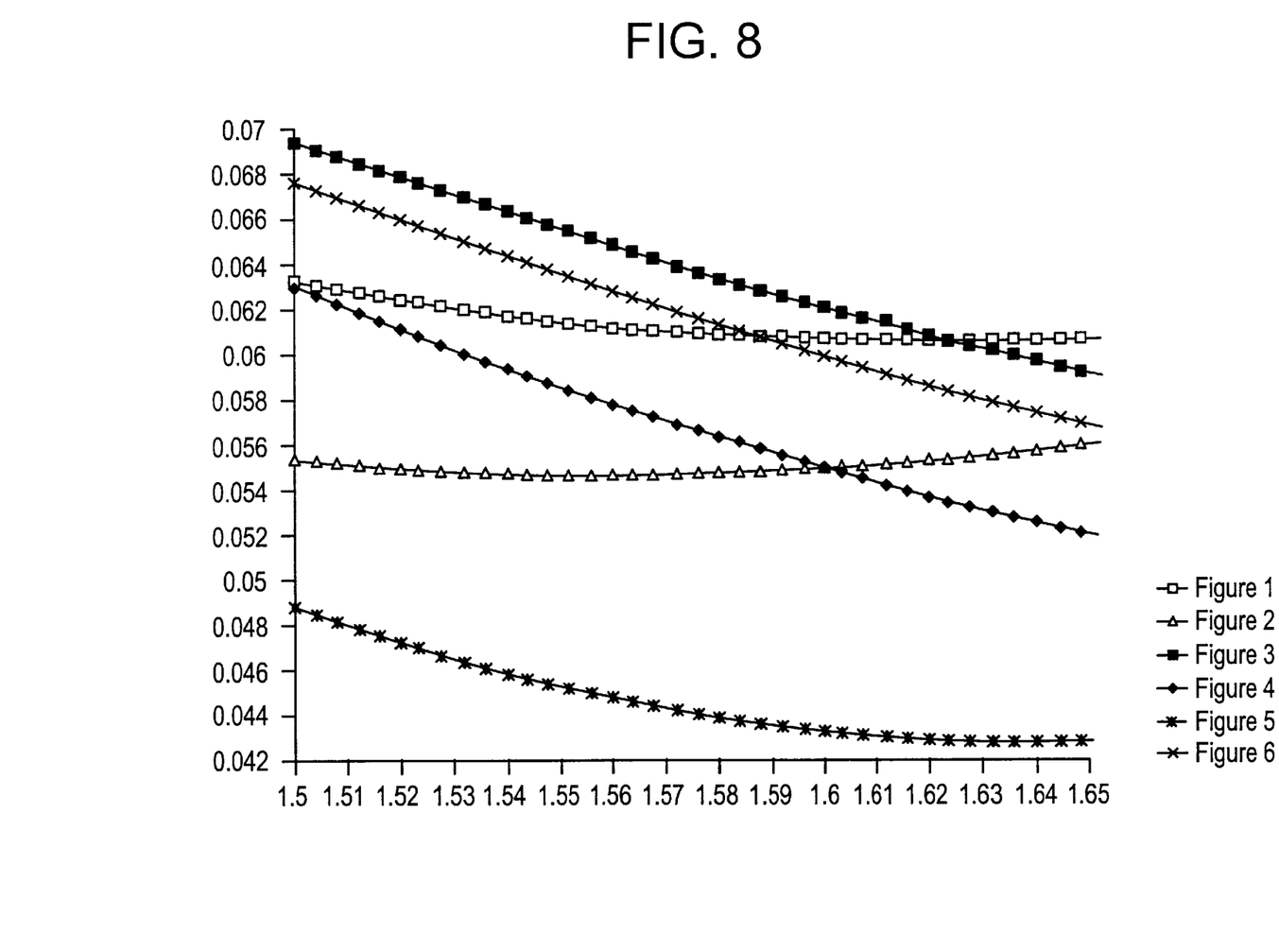
FIG. 8 is a graph showing dispersion slope as a function of wavelength for various fibers of the invention.

FIG. 8 is a graph plotting the slope of dispersion as a function of wavelength for the various fibers given by way of example. Wavelength in micrometers is plotted along the abscissa, and chromatic dispersion slope is plotted up the ordinate in ps/(nm$^2$.km). The various curves show how chromatic dispersion slope varies as a function of wavelength for fibers constituting the first to sixth embodiments described above.

In the figure, it can be seen that the slope of chromatic dispersion at 1550 nm is always less than 0.07 ps1 (nm$^2$.km). In the fifth embodiment of the invention, the slope of chromatic dispersions at 1550 nm is less than 0.05 ps/(nm$^2$.km).

The invention can be manufactured by the person skilled in the art using conventional techniques such as MCVD or other techniques commonly used in the manufacture of optical fibers.

Naturally, the present invention is not limited to the embodiments described and shown, and it can be varied in numerous ways by the person skilled in the art. It is clear that the profiles of FIGS. 1 to 6 are given purely by way of example, and that other profiles can be used to obtain fibers having the characteristics of the invention.

What is claimed is:

1. A monomode optical fiber that presents, at a wavelength of 1550 nm:

an effective section area greater than or equal to 60 μm$^2$;

chromatic dispersion lying in the range 6 ps/(nm.km) to 10 ps/(nm.km), and chromatic dispersion having a slope of absolute value less than 0.07 ps/(nm$^2$.km).

2. The fiber of claim 1, having chromatic dispersion at 1550 nm in the range 7 ps/(nm.km) to 9 ps/(nm.km).

3. The fiber according to claim 1, presenting chromatic dispersion greater than or equal to 7 ps/(nm.km) in the range 1530 nm to 1620 nm.

4. The fiber according to claim 1, having a chromatic dispersion slope at 1550 nm less than 0.05 ps/(nm$^2$.km).

5. The fiber according to claim 1, having an effective section area greater than or equal to 90 μm$^2$.

6. The fiber according to claim 1, having a mode radius at 1550 nm greater than 4 μm.

7. The fiber according to claim 1, having attenuation at 1550 nm less than or equal to 0.23 dB/km.

8. The fiber according to claim 1, having polarization mode dispersion less than or equal to 0.08 ps.km$^{-0.5}$.

9. The fiber according to claim 1, having an index profile in the shape of a trapezoid with a ring.

10. The fiber according to claim 1, having an index profile that is coaxial with a ring.

11. The fiber according to claim 1, having a coaxial index profile with a buried outer portion.

12. A WDM optical fiber transmission system including the fiber according to claim 1 as a line fiber.

13. The transmission system according to claim 12, further including dispersion-compensating fiber.

* * * * *